No. 884,260. PATENTED APR. 7, 1908.
G. W. BOYD.
LOCK NUT.
APPLICATION FILED JUNE 6, 1907.

Witnesses.

Inventor
George W. Boyd,
By
James L. Norris
Att'y.

UNITED STATES PATENT OFFICE.

GEORGE W. BOYD, OF NASHVILLE, TENNESSEE, ASSIGNOR TO MARY F. BOYD, OF NASHVILLE, TENNESSEE.

LOCK-NUT.

No. 884,260.  Specification of Letters Patent.  Patented April 7, 1908.

Application filed June 6, 1907. Serial No. 377,630.

*To all whom it may concern:*

Be it known that I, GEORGE W. BOYD, a citizen of the United States, residing at Nashville, in the county of Davidson and State of Tennessee, have invented new and useful Improvements in Lock-Nuts, of which the following is a specification.

This invention relates to nut locks, and the object thereof is to provide a nut lock in a manner as hereinafter set forth which is particularly adapted for locking nuts upon the axle of a vehicle.

Further objects of the invention are to provide a simple, effective, strong, durable and efficient nut lock which may be readily applied to vehicles which are now in use by any carriage-smith or black-smith, and further, without excessive cost.

With the foregoing and other objects in view the invention consists of the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In describing the invention in detail reference is had to the accompanying drawings wherein like characters denote corresponding parts throughout the several views, and in which—

Figure 1:
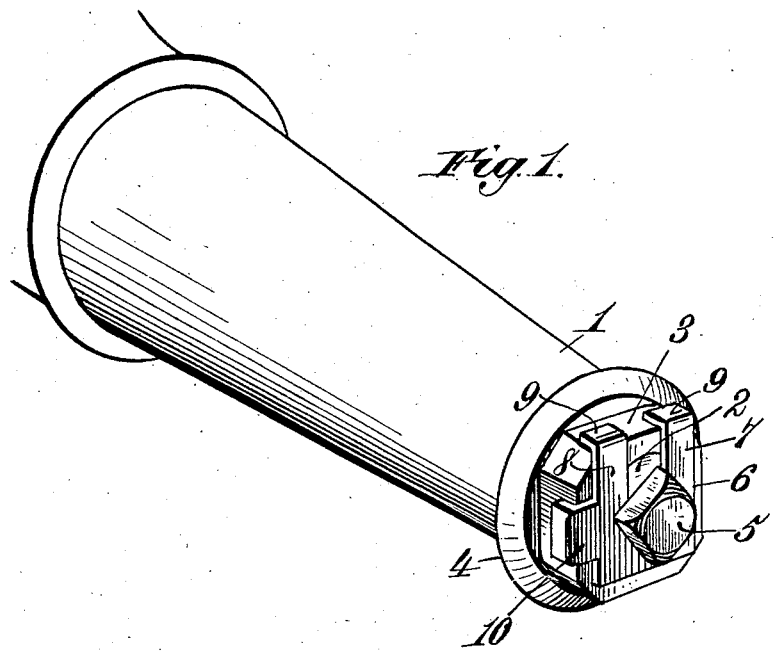
Figure 2:
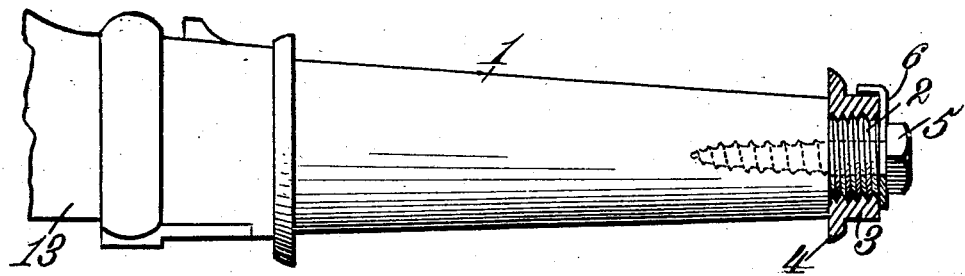
Figure 3:
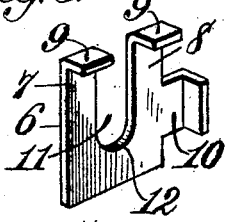
Figure 4:
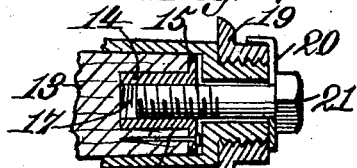

Figure 1 is a perspective view of an axle showing the application thereto of a nut lock in accordance with this invention; Fig. 2 is a side elevation partly in section, and, Fig. 3 is a detail of the locking washer. Fig. 4 is a sectional detail of a modification.

Referring to the drawings by reference characters, 1 denotes an axle skein of known construction, upon the screw-threaded boss 2 of which is mounted the binding nut 3 provided with a flange 4 which is adapted to abut against the axle box (not shown). The screw-threaded boss 2 is formed with an opening through which is adapted to extend the lag-screw 5, the latter engaging in the axle.

To prevent the turning or removal of the nut 3 a washer 6 is provided which is retained in position by the lag screw 5 and is substantially U-shaped in contour with the vertical portions 7—8 thereof formed with angularly-extending ears 9 which are adapted to engage the top of the nut. Formed integral with the portion 8 is an angular extension 10 adapted to engage one side of the nut. The slot 11 in the washer allows for the passage of the lag screw 5.

When the washer is placed in position the ears 9 prevent it from dropping down. The angular extension will prevent lateral movement of the washer and the bottom wall 12 of the slot 11 will arrest the vertical movement of the washer. The washer is held in position through the medium of the lag screw 5, and owing to the engagement of the ears 9 with the top of the nut and the angular extension 10 with the side, it is evident that the nut will be prevented from turning upon the screw-threaded boss 2 so that there will be no danger of the nut falling off as would be the case if the washer 6 was not employed.

In the modification shown in Fig. 4 the axle is indicated by the reference character 13 and it is provided with a recess in which is mounted a hollow tubular member 14 having its outer end provided with an annular flange 15 which abuts against the outer end of the axle 13 and is secured thereto by means of the hold-fast devices 16. The inner face of the member 14 is screw-threaded as at 17. The axle skein is indicated by the reference character 18, the binding nut by the reference character 19 and the washer by the reference character 20. The binding nut 19 and washer 20 are constructed in the same manner as those hereinbefore referred to. Extending through the washer 20 and skein 18 is a headed bolt 21 having its inner end formed with screw threads which are adapted to engage with the screw threads 17 provided on the inner face of the tubular member 14, the bolt 21 being the equivalent of the lag screw 5.

What I claim is—

Means for locking nuts on axle skeins, axles and the like, comprising the combination with the nut, of a U-shaped washer having its top formed with a pair of angularly-disposed integral ears extending over and engaging one side of the nut to prevent the dropping down of the washer when in position against the outer face of the nut, said washer further provided with an angular extension engaging another side of the nut to prevent transverse movement of the washer in one direction when in position against the outer face of the nut, a screw extending through the slot of the washer and engaging in the axle for retaining the washer against the nut, the inner face of the head of the screw bearing against the outer face of the washer, said washer when retained in position by said screw preventing the removal of the nut.

In testimony whereof I have hereunto set my hand in presence of two subscribing witnesses.

GEORGE W. BOYD.

Witnesses:
L. R. SUMMITT,
E. W. CUNNINGHAM.